Oct. 16, 1956  W. KASTEN  2,766,890
FLUID PURIFIER
Filed July 8, 1949

INVENTOR.
WALTER KASTEN
BY
M. A. Hobbs
ATTORNEY

United States Patent Office 2,766,890
Patented Oct. 16, 1956

2,766,890

FLUID PURIFIER

Walter Kasten, Detroit, Mich., assignor to Bendix Aviation Corporation, South Bend, Ind., a corporation of Delaware Application July 8, 1949, Serial No. 103,639

1 Claim. (Cl. 210—183)

The present invention relates to an improvement in fluid demulsifying devices.

Figure 1:
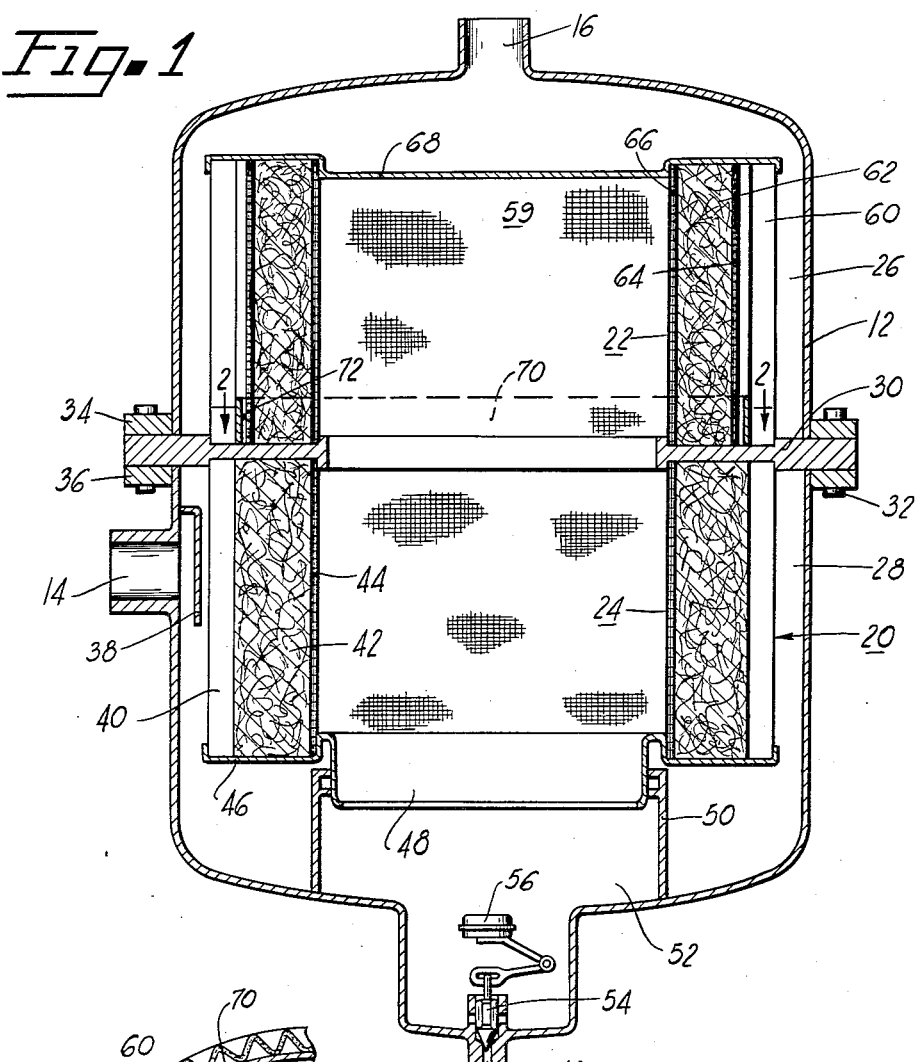
Figure 2:
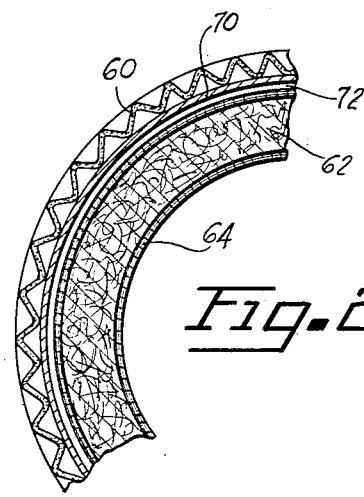

In the demulsification of two fluids, such as water and gasoline or fuel oil, the dispersed phase or contaminant is caused to coalesce into droplets of such size that any difference in specific gravity between the two phases will result in the separation of the phases into two separate layers. In the treatment of large quantities of fluid at relatively high velocities, the coalesced droplets may, however, separate so slowly that they are carried along with the continuous phase through the demulsifying unit and may even become re-emulsified after leaving the unit. It is, therefore, one of the principal objects of the present invention to provide a means which will cause the coalesced droplets of the contaminant or dispersed phase to further coalesce to form bodies of such size that they readily separate from the continuous phase even though the fluid may be following at relatively high velocities. Another object is to provide a means whereby coalesced droplets of water suspended in gasoline, fuel oil or the like are collected and readily separated into a separate layer. Further objects and advantages of the present invention will be apparent from the following description and accompanying drawings, wherein:

Figure 1 is a vertical cross-section through a demulsifying unit embodying the present invention; and Figure 2 is a fragmentary cross-sectional view of the element of the demulsifying unit taken on line 2—2 of Figure 1.

Referring more specifically to the drawings, numeral 12 designates the housing or casing of my demulsifying unit, 14 an inlet passage for the contaminated fluid, 16 an outlet passage for the purified fluid, 18 an outlet passage for the contaminating fluid, and 20 a filtering and demulsifying element composed of two sections 22 and 24 mounted in upper and lower chambers 26 and 28, respectively of housing 12. The upper and lower chambers 26 and 28 are separated by an annular partition 30 held in place between the upper and lower halves of the housing by suitable bolts 32 in flanges 34 and 36 of the upper and lower halves, respectively. The lower section 24 of the filtering and demulsifying element through which the contaminated fluid initially passes after it enters the unit and is distributed by a baffle plate 38 consists of an external member 40 of a pleated cylindrical-shaped paper filter which is preferably impregnated with a resinous material to make it resistant to water, gasoline, kerosene and the like, and an internal member 42 of a fine fibrous mass of material, such as fiberglass, contained in an annular space between the inside wall of the external member 40 and a perforated metal or wire screen cylinder 44 disposed concentrically inside of the external member and in spaced relation thereto. The lower end of section 24 between the external member and the metal cylinder is sealed by an impervious ring 46 cemented or otherwise secured to the end of said member and said cylinder. The ring 46 is provided with an interior downwardly turned flange 48 which is adapted to seat on a ring-shaped member 50 and to support said lower section 24 in operative position against the lower side of partition 30 which completely encloses the upper end of the space between the external member 40 and cylinder 44. The ring-shaped member 50 forms a chamber 52 for receiving the coalesced droplets of water or other fluid contaminant as said droplets settle downwardly from the internal portion of the demulsifying element 20 through the large opening defined by flange 48 of ring 46. The outlet for the contaminant in the bottom of chamber 52 is controlled by a valve 54 actuated by a float mechanism 56 which is adapted to be lifted when the contaminant reaches a predetermined level to permit the contaminant to discharge through outlet 18.

The upper section 22 of filter element 20 consists of a porous paper filter member 60 of the same material comprising the walls of the filter element 40 and a mass of fibrous material 62 confined within the space provided between two perforated metallic or screen cylinders 64 and 66, 64 being spaced from the internal surface of member 60 such as to provide a fluid passageway or chamber completely surrounding the outside surface of cylinder 64. The upper end of section 59 is completely sealed by an impervious disc-shaped member 68, and the lower end of said section seats on the upper side of partition 30 which completely seals the lower end of the annular space between the filter element 60 and the perforated metallic or screen cylinder 64.

A wall 70 of impervious material such as metal or plastics is disposed in the annular space around the outside of cylinder 64 at the base thereof and is spaced from said cylinder to provide a channel 72 for receiving any fluid contaminant passing through material 62. Preferably, the external surface of wall 70 is in contact with the internal surface of member 60 to give the latter internal support. In the demulsifying operation, the contaminant, i. e. any fluid contaminant of greater specific gravity than the continuous phase, as for example water and gasoline, respectively, passing through the fibrous material 62 collects on the external surface of cylinder 64 and runs down said surface into the channel 72 formed by the lower margin of cylinder 64 and wall 70. The contaminant collecting in said channel creates a head or pressure greater than the differential in pressure across the fibrous material 62, thus causing the contaminant to flow through the mass of fibrous material from outside-to-inside, this being in the upstream direction in relation to the fluid flow through the element. The contaminant flowing in the reverse direction through this mass of fibrous material remains in relatively large bodies such that when it emerges from the fibrous material, it readily descends through the fluid to the chamber 52. Thus, it is seen that any contaminant which is not separated by the lower section 24 of the demulsifying element is separated by section 22 in cooperation with channel 72. The purified fluid passes through the filter member 60 and flows upwardly in the space between the said member and the internal surface of the upper half of the housing into the upper portion of said housing and outwardly through fluid outlet passage 16.

In the operation of the present device, fluid flows into the demulsifying unit through inlet passage 14 and is dispersed by baffle plate 38 so that it flows around the space between the lower half of housing 12 and filter member 40 and thence passes through said filter member and member 42 of fibrous material where the dispersed phase is caused to coalesce into relatively large droplets. When these droplets reach the hollow internal portion of the demulsifying elements, most of the droplets are of sufficient size to overcome the velocity effect of the continuous phase and settle downwardly into chamber 52 where they form a separate layer of contaminant which is withdrawn through outlet 18 when a predetermined level of said layer is reached. Some of the smaller droplets may pass upwardly with the continuous phase, thence through the fibrous material 62 and collect on the external surface of cylinder 64. The contaminant collecting on the external surface passes downwardly into channel 72 and when sufficient fluid has collected in said channel to overcome the differential in pressure across the fibrous material 62, it flows through the lower end of said material as relatively large bodies of fluid and falls by gravity into chamber 52 to become a part of the separate layer of contaminant in said chamber. The purified fluid passes upwardly between the filter element 60 and the upper half of housing 12 and flows from the demulsifying unit through outlet 16.

Although only one embodiment of my invention has been shown and described herein, it is understood that many modifications may be made to suit requirements. For example, wall 70 may follow the pleated walls of member 60 or even be formed integrally with the lower edge thereof, thus giving somewhat greater internal support to said member. Further, the element 20 may be in the form of plates or the like instead of the cylinders, as shown in the drawings, with the contaminant chamber 52 disposed between said plates.

I claim:

A liquid demulsifying device comprising a casing, a horizontal partition dividing said casing into two compartments and having a central port therethrough, a liquid inlet passage in the lower compartment, a liquid outlet passage in the upper compartment, a hollow cylindrical demulsifying element mounted on said partition around said port in each compartment, the hollow interiors of said elements communicating with one another through said port, a perforated retaining member on the downstream side of the element in the upper compartment, an annular wall disposed near the bottom of said member and spaced therefrom forming a channel for receiving the contaminant, and imperforate bottom in said channel, the height of said wall being such that the pressure of the contaminant in said channel may become greater than the drop in pressure across said demulsifying element.

References Cited in the file of this patent

UNITED STATES PATENTS

| | | |
|---|---|---|
| 1,425,366 | Chapman | Aug. 8, 1922 |
| 1,665,164 | Gard et al. | April 3, 1928 |
| 1,787,577 | Hills | Jan. 6, 1931 |
| 1,866,519 | Rataiczak | July 5, 1932 |
| 1,947,709 | Garrison et al. | Feb. 20, 1934 |
| 2,122,310 | Burt | June 28, 1938 |
| 2,374,094 | Harvuot | April 17, 1945 |
| 2,468,382 | Taylor | April 26, 1949 |

FOREIGN PATENTS

| | | |
|---|---|---|
| 632,698 | Germany | July 11, 1936 |